United States Patent [19]

Thomas

[11] Patent Number: 5,638,137
[45] Date of Patent: Jun. 10, 1997

[54] CONFIGURABLE VIDEO OUTPUT CHANNEL ARCHITECTURE

[75] Inventor: Larry J. Thomas, Albuquerque, N.M.

[73] Assignee: Honeywell Inc., Minneapolis, Minn.

[21] Appl. No.: 173,392

[22] Filed: Dec. 22, 1993

[51] Int. Cl.$^6$ .......................... H04N 5/57; H04N 17/00; H04N 5/52; H04N 5/18

[52] U.S. Cl. .................. 348/673; 348/181; 348/682; 348/689

[58] Field of Search .................... 348/682, 712, 348/713, 634, 635, 517, 604, 555, 180, 181, 184, 707, 671, 673, 678, 679, 686, 687, 689; 371/42; H04N 5/46, 5/57, 17/00, 5/52, 5/18

[56] References Cited

U.S. PATENT DOCUMENTS 4,011,587  3/1977  Arter et al. .......................... 360/62

FOREIGN PATENT DOCUMENTS 2 630 282  10/1989  France .
2669171  5/1992  France .
WO93/12616  3/1987  Germany .

OTHER PUBLICATIONS

Computer Design, vol. 23, No. 13, Nov. 1984, Littleton, MA, R.R. Castleberry, "High Spped D-A Converters Yield Precision Graphics".

Primary Examiner—John K. Peng
Assistant Examiner—John W. Miller
Attorney, Agent, or Firm—Kenneth J. Johnson

[57] ABSTRACT

A configurable video output channel architecture includes a plurality of parallel video pipelines arranged to drive a video display; a device for selecting an output of one of the video pipelines and generating a readback signal representative thereof; and a device for adjusting a display specification of at least one of the video pipelines using the readback signal. The display specification adjusted may include the maximum video level, the blanking level, and the sync level of the video waveform. The adjusting device may also adjust the characteristic impedance of each pipeline. The selecting device includes a multiplexer and an analog to digital converter, and the adjusting device includes a controller which monitors the readback signal and generates a control signal to adjust the display specification if the readback signal is outside of a desired range.

7 Claims, 3 Drawing Sheets

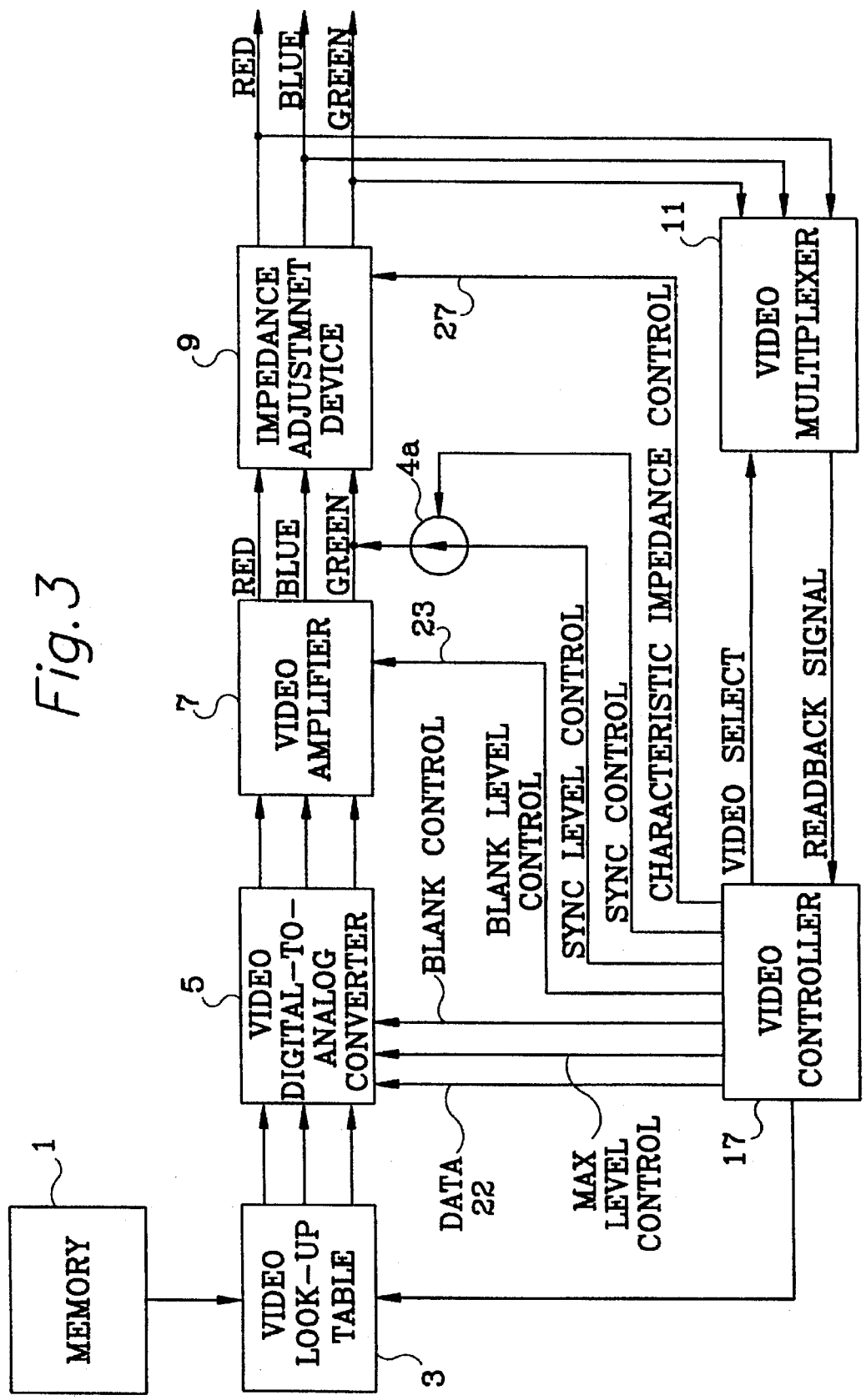

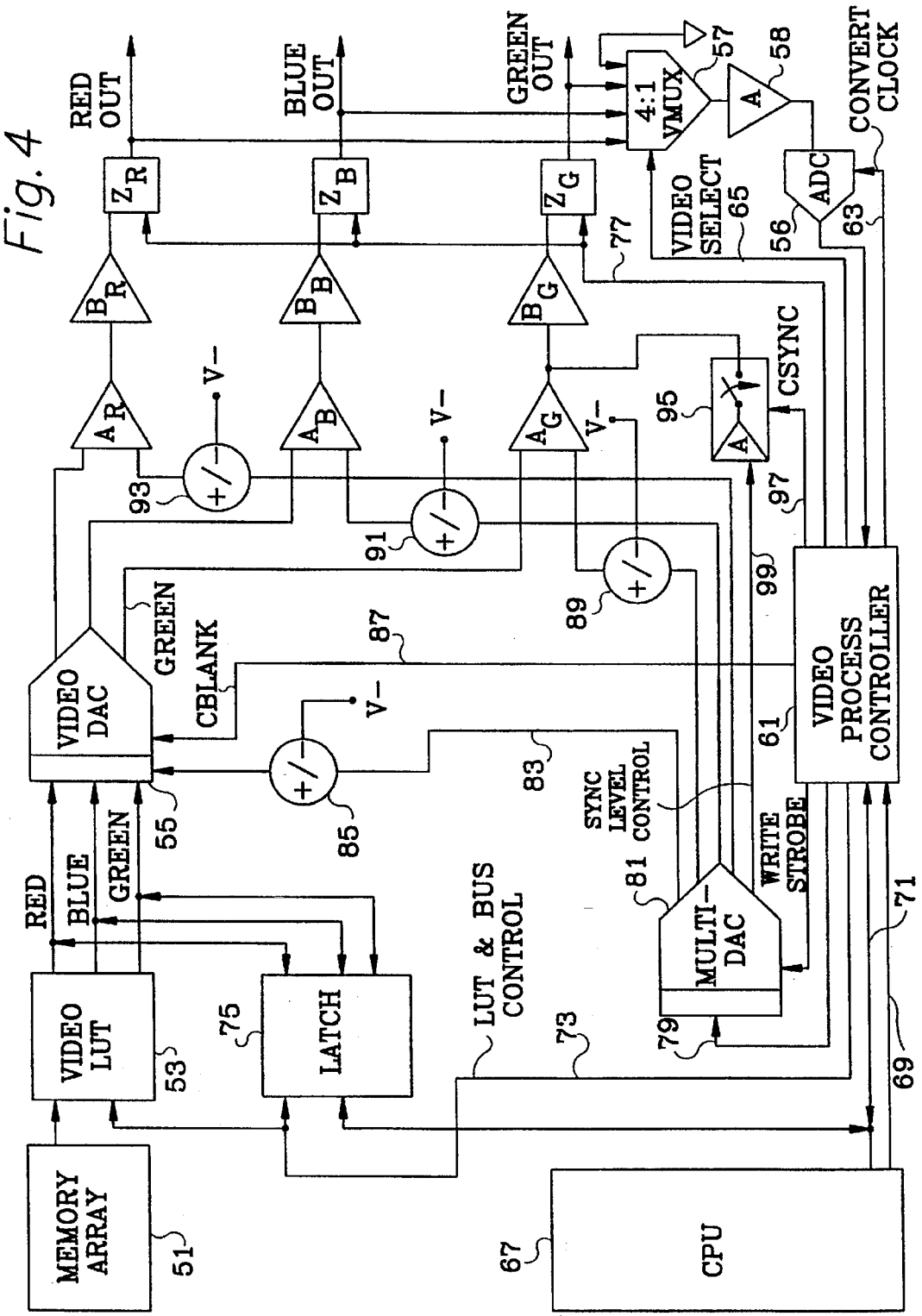

CONFIGURABLE VIDEO OUTPUT CHANNEL ARCHITECTURE

GOVERNMENT RIGHTS

The Government has rights in this invention pursuant to Contract No. F33600-88-G-5107, awarded by the Department of the Air Force.

BACKGROUND OF THE INVENTION

The invention relates to a video output channel architecture. More particularly, the invention relates to a video output channel architecture which can be configured to meet different display standards.

A known video output channel architecture is shown in FIG. 1. In this architecture, the various parts of the composite video waveform are derived from three separate sources. The first is a digital video memory 1, which stores all of the information necessary to form the picture portion of the video waveform. As the memory 1 is scanned, addresses are presented to a video look-up table 3, which outputs three data values corresponding to the red, blue, and green color values for the current pixel. These digital values are then converted into analog signals by a video digital-to-analog converter 5. Video amplifier 7 then amplifies the analog signals to a level acceptable to drive the display.

The second source of information for the composite video waveform is a blank control signal generated by controller 4. The blank control signal instructs the digital-to-analog converter 5 to ignore the input data and output a zero level, and thus controls the blanking portion of the video waveform. The third source of information is the sync control signal, also generated by controller 4. The sync control signal controls application of a current source 4a to the green channel of the video output, and thus adds the appropriate sync level to drive the display.

A "snap-shot" of a typical video waveform is shown in FIG. 2. The levels of different portions of this waveform are important for conformance with industry display standards. Level A of the waveform in FIG. 2 is the maximum video level, i.e., the maximum of the active video region above the blanking or black level; the blank and black level can be at the same level for certain video DACs used. Level B is the composite sync level of the waveform, and level C refers to the blanking level. Each of these levels must be within certain specifications in order to meet a given display standard. Also important to conformance with a given display standard is the characteristic impedance of the output channel. The specifications for three representative display standards are shown in the table below:

|  | Specifications | | | |
| --- | --- | --- | --- | --- |
|  | A | B | C | Impedance |
| RS170 (Mono) | 1.0 | 0.4 | 0.075 | 75 |
| RS170 (Color) | 0.70 | 0.28 | 0.0525 | 75 |
| RS330 | 0.714 | 0.286 | 0.0535 | 75 |

According to the prior art, a video output channel such as that shown in FIG. 1 must be designed specifically to meet one of these industry standards. Thus, if it is desired to use a different standard, i.e., to use a different video display, a different output channel architecture must be used. Clearly, this is cumbersome and prevents swift reconfiguration of a video system.

SUMMARY OF THE INVENTION

The invention overcomes the above-stated disadvantages of the prior art by providing a configurable video output channel architecture which allows both static and "on the fly" adjustment of maximum picture level, blanking level, sync level, and characteristic impedance. Particularly, in some embodiments, the configurable video output channel architecture of the invention comprises a plurality of parallel video pipelines adapted to drive a video display; selecting means for selecting an output of one of the video pipelines and generating a readback signal representative thereof; and adjusting means for adjusting a display specification of at least one of the video pipelines using the readback signal.

In some aspects, the display specification is the maximum video level, the blanking level, or the sync level of the video waveform. In some aspects, the adjusting means adjusts the characteristic impedance of each pipeline.

In some aspects, the selecting means comprises a multiplexer and an analog to digital converter; and the adjusting means comprises a controller which monitors the readback signal and generates a control signal to adjust the display specification if the readback signal is outside of a desired range.

In some aspects, the adjusting means comprises means for forcing test data into one of the video pipelines, and means for adjusting the display specification in accordance with the readback signal.

In other embodiments, the invention comprises random access memory which stores digital video data; a video look-up table which converts the digital video data into digital color values; digital to analog conversion means for converting the digital color values into analog color signals; a video amplifier for amplifying the analog color signals; selecting means for selecting one of the analog color signals and outputting a readback signal representative thereof; and adjusting means for adjusting a maximum picture level of the analog color signals to be within a desired range using said readback signal.

In some aspects, the adjusting means comprises a controller for monitoring the readback signal and outputting an adjustment control signal, a digital to analog converter for converting the adjustment control signal to analog form, and a voltage adjustment device for adjusting the maximum picture level in accordance with the analog adjustment control signal. In some aspects, the invention includes means for replacing one of the digital color values with test data, wherein a corresponding one of the analog color signals is selected by the selecting means.

In other embodiments, the invention comprises random access memory which stores digital video data; a video look-up table which converts the digital video data into digital color values; digital to analog conversion means for converting the digital color values into analog color signals; a video amplifier for amplifying the analog color signals; selecting means for selecting one of the analog color signals and outputting a readback signal representative thereof; and adjusting means for adjusting a blanking level of one of the analog color signals to be within a desired range using the readback signal.

In some aspects, the adjusting means comprises a controller for monitoring the readback signal and outputting an adjustment control signal, a digital to analog converter for converting the adjustment control signal to analog form, and a voltage adjustment device for adjusting the blanking level of the one analog color signal in accordance with the analog adjustment control signal. In some aspects, the invention includes means for replacing one of the digital color values with test data, wherein a corresponding one of the analog color signals is selected by the selecting means.

In other embodiments, the invention comprises random access memory which stores digital video data; a video look-up table which converts the digital video data into digital color values; digital to analog conversion means for converting the digital color values into analog color signals; a video amplifier for amplifying the analog color signals; selecting means for selecting one of the analog color signals and outputting a readback signal representative thereof; and characteristic impedance adjusting means for adjusting a characteristic impedance of the analog color signal output circuit to be within a desired range using the readback signal.

In some aspects, the adjusting means comprises a source impedance circuit and a controller for monitoring the readback signal and outputting an adjustment control signal in accordance therewith. In some aspects, the invention includes means for replacing one of the digital color values with test data, wherein a corresponding one of the analog color signals is selected by the selecting means.

In some embodiments, the invention comprises random access memory which stores digital video data; a video look-up table which converts the digital video data into digital color values; digital to analog conversion means for converting the digital color values into analog color signals; a video amplifier for amplifying the analog color signals; selecting means for selecting one of the analog color signals and outputting a readback signal representative thereof; and selecting means for adjusting a composite sync level of one of the analog color signals to be within a desired range using the readback signal.

In some aspects, the adjusting means comprises a controller for monitoring the readback signal and outputting an adjustment control signal, a digital to analog converter for converting the adjustment control signal to analog form, and a current source for adjusting the sync level of the one analog color signal in accordance with the analog adjustment control signal.

The invention also relates to a method for reconfiguring a video output channel having a plurality of parallel pipelines adapted to drive a display, comprising the steps of: A) forcing a test condition onto one of the pipelines; B) monitoring a video parameter of the output of the one pipeline to determine if the parameter is within a desired range; C) generating a control signal to adjust the pipeline if the parameter is outside the desired range; D) repeating steps A through C for a plurality of video parameters.

In some aspects, the method of the invention further comprises the step of repeating steps A through D for each of the plurality of pipelines.

BRIEF DESCRIPTION OF THE DRAWINGS

FIG. 3 is a block diagram according to one embodiment of the invention; and

FIG. 4 is a detailed schematic diagram of a preferred embodiment of the invention.

DESCRIPTION OF THE PREFERRED EMBODIMENTS

Preferred embodiments of the invention will now be described with reference to the attached figures.

Figure 1:
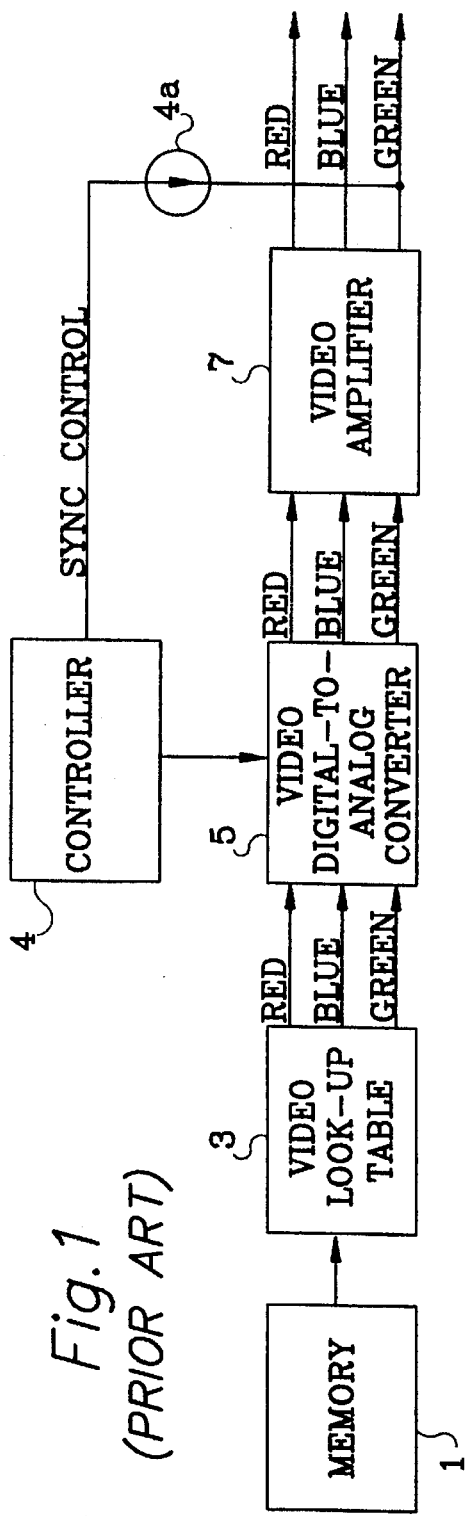
FIG. 1 is a block diagram of a prior art video output channel architecture.
Figure 2:
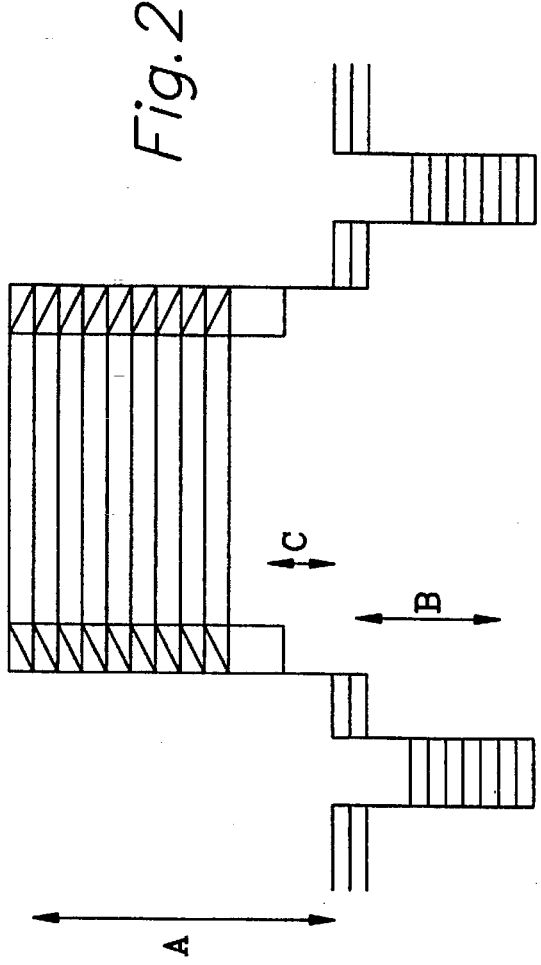
FIG. 2 is a snap shot of a video signal according to the prior art.

A block diagram of an embodiment of the invention is shown in FIG. 3, with like elements with respect to FIG. 1 being denoted with the same reference numerals. The video output channel architecture of this embodiment includes the memory 1, video look-up table (VLUT) 3, video digital-to-analog converter (VDAC) 5, and video amplifier 7 described above with reference to FIG. 1. In addition, this embodiment includes an impedance adjustment device 9 disposed at the output of video amplifier 7. The impedance adjustment device 9 outputs a standard RGB video signal to drive the display. This output is also applied to a video multiplexer (VMUX) 11, which generates a readback signal 13 under the control of video select signal 15 generated by a video controller 17. Video controller 17 performs the functions of controller 4 in FIG. 1 in addition to controlling adjustment of the maximum video level, blanking level, sync level, and characteristic impedance of the output based on the readback signal 13. Particularly, video controller 17 generates a max level control 21 for control of the maximum video level via VDAC 5, blank level control 23 for control of the blanking level via video amplifier 7, sync level control 25 for control of the sync level via current source 4a, and characteristic impedance control 27 for control of the impedance adjusting device 9.

In operation, configuration of the video output channel architecture to a desired display standard is executed by video controller 17 as follows. Impedance matching is performed first. To set the impedance of impedance adjustment device 9, one video channel is selected via VMUX 11 by video select 15, and a known video level is forced onto this video channel by video controller 17 over data line 22. Based on readback signal 13, characteristic impedance control 27 is adjusted until the characteristic impedance of the selected channel has the desired value. As the impedance on all these channels will be the same, it is not necessary to repeat this procedure for the other two of the red, blue, and green signal outputs.

To adjust the maximum video level, video controller 17 again selects a specific video channel by manipulating VMUX 11 via video select 15. Then, video controller 17 loads a maximum data value into the selected channel of VDAC 5 via data line 22. The output of this channel is monitored via readback signal 13, and if the read back data value does not fall within pre-defined limits for the desired display standard, the level is adjusted via max level control 21 until the read back value falls within those limits. The VDAC 5 is preferably a multiple type wherein all the individual DACs within the device will be adjusted simultaneously. If, however, VDACs are used, it will be necessary to repeat the above procedure for each channel.

As explained with reference to FIG. 1 above, the blanking portion of the video signal is inserted by the blank control signal, which instructs VDAC 5 to ignore the incoming memory data and output a zero or black level output while the control signal is valid. Due to circuit offsets, however, the output level of the blanking portion of the waveform may not be exactly zero. Alternatively, it may be desired to offset the blanking level slightly for a given application. In either event, the level of the blanking portion may be adjusted by blank level control 23, which is applied to video amplifier 7. To perform the adjustment, one channel is selected by VMUX 11, and this channel is forced into composite blank by the video process controller 17. If the read back data value on readback signal 13 does not fall within a pre-defined limit for the desired display standard, this level is adjusted by a blank level control 23. This procedure is then repeated for the other two channels.

As noted above, the composite sync portion of the video waveform is inserted on only the green channel. In FIG. 3, insertion of the sync portion onto the composite video waveform is controlled by sync control 26, which enables current source 4a onto the video output to produce the composite sync output level. To adjust the composite sync level, the green channel is selected via VMUX 11 and this channel is forced into composite sync by the video process controller 17. The value on this channel is monitored via readback signal 13 during the composite sync time. If the read back data value does not fall within a pre-defined limit for the desired display standard, the necessary adjustments are made via sync level control 25.

A detailed implementation of a preferred embodiment of the invention is shown in FIG. 4. In this embodiment, memory array 51 contains in digital form all the information necessary to build the picture portion of the video waveform. As the memory array is scanned on a pixel by pixel basis, addresses are presented to the video look-up table (VLUT) 53, which presents three data values representing red, blue, and green colors to the front end of three identical video pipelines. These values are presented to video DAC 55, which actually consists of three separate digital-to-analog converters such as the ADV 7120 available from Analog Devices. Video DAC 55 converts each of the data values into an analog signal to drive the video circuit pipelines. Each pipeline includes a very high slew rate and high bandwidth amplifier ($A_R$, $A_B$, $A_G$), a high slew rate and high bandwidth output current buffer ($B_R$, $B_B$, $B_G$), and a programmable source impedance circuit ($Z_R$, $Z_B$, $Z_G$). The outputs of the source impedance circuits represent a conventional RGB video signal, and these outputs are also applied to a video multiplexer (VMUX) 57. The VMUX is preferably a 4:1 multiplexer with three of the inputs connected to the outputs of the three programmable source impedance circuits, respectively, and the fourth input being tied low. This fourth input is used for read-back error adjustments. The output of VMUX 57 is amplified by amplifier 58 and applied to an analog-to-digital converter (ADC) 59, which in turn applies a digital signal to video process controller 61. Video process controller 61 generates a convert clock signal on line 63 which enables the ADC 59 to capture a "snap-shot" of the video signal applied from VMUX 57. Video process controller 61 also generates a video select signal on line 65 which is applied to VMUX 57 to allow selection of one of the red, blue, and green input signals.

Processing unit (CPU) 67 is used to execute a video test/adjustment procedure. CPU 67 reads the conversion read-back value from the video process controller 61 via bidirectional data bus 71, processes this data value, and then sends an adjustment value, if necessary, to the video process controller 61 via data bus 71. The complete video process function is started with CPU 67 arming a module "video process start" within video process controller 61. Video process controller 61 performs the sequential video process function and upon completion disarms "video process start" and sets the "video process complete" flag. CPU 67 monitors the "video process complete" flag and once it has been set, retrieves the most recent "read-back" data value from video process controller 61. CPU 67 then performs a video test/ adjustment algorithm (described in more detail below) to determine whether or not an adjustment needs to be made relative to a particular video parameter currently being tested. If an adjustment is needed, CPU 67 sends an adjustment data value to video process controller 61. This data value is then pipelined through video process controller 61 and output to multi-DAC 81 via line 79, or impedance adjustment circuits $Z_R$, $Z_S$, $Z_G$ via line 77.

The video process controller 61 is controlled by CPU 67 and preferably is implemented with a field programmable gate array (FPGA) such as the A1240 manufactured by ACTEL. The FPGA is necessary to act as the dedicated video timer and to provide the necessary interface with the various components of this embodiment of this invention. The CPU 67 would not provide these functions in a very efficient manner and it would be a waste of its full capabilities to provide these dedicated non-processing involved functions. The video process controller 61 is provided with control signals from the CPU (via line 69), and uses these to generate modified control signals to interface to the remaining components. Data is transferred between CPU 67 and the video process controller 61 via bidirectional data bus 71. The bidirectional data bus 71 is also applied to a transceiver/ register block (latch) 75 (such as an FCT646) which can be used to latch the CPU data and force this data to each of the red, blue, and green channels between the VLUT 53 and the VDAC 55. In this way, desired video levels can be placed on any of the red, blue, and green channels via latch 75 during a calibration procedure. Latch 75 also serves as a mechanism to latch data outputs from video LUT 53 as memory array 51 is actively being scanned. As explained in more detail below, this allows for uninterrupted, dynamic testing of the active video portion of a composite waveform for any given video channel selected. Various look-up table and bus control signals are generated by video process controller 61 and applied to latch 75 and video look-up table 53 via line 73.

In some cases, it may be desirable to integrate the CPU 67 and video process controller 61 functions into one component. This would not change the scope of the invention.

The manner in which this embodiment of the invention is calibrated to a desired display standard will now be described in detail. The readback error (i.e. offsets) due to the readback circuitry is determined first. The ground reference into VMUX 57 is selected, amplified and possibly level shifted by amplifier 58, converted into digital form by ADC 59, and latched into video process controller 61. CPU 67 then reads the value contained within video process controller 61 via bidirectional data bus 71. This value is retained by the CPU to be used as a correction parameter when performing the video test/adjustment algorithm. The read-back error parameter should be recalculated periodically or prior to each major adjustment period as this may vary with temperature.

Following this step, the video channel to be calibrated or dynamically adjusted is selected via VMUX 57. In most cases, there are four (4) sections of each video channel which would be tested, calibrated or adjusted. These include, in order of test/adjust, the composite blank level setting, the source impedance match setting, the maximum active video level setting, and the composite sync level setting. In most cases, the impedance match setting should only need to be done once on power-up. Also, the composite sync level setting only needs to be performed on the green video channel.

The first step in the test/calibration procedure is adjustment of the blanking portion of the selected video channel. The blanking portion of the video signal is inserted by a "CBLANK" signal generated by video process controller 61 and applied to video DAC 55 via line 87. When CBLANK is active, video DAC 55 ignores the incoming data and establishes a zero output on all three video channels. The final output of the video channel selected is amplified and possibly level shifted by amplifier 58, converted into digital form by ADC 59, and latched into video process controller 61. CPU 67 then reads the value contained within video process controller 61 via bidirectional data bus 71. A "blank snap-shot" of the output on this channel is obtained by ADC 59 under the control of convert clock signal 63 and latched into video process controller 61. CPU 67 retrieves this "blank" data value from video process controller 61 and determines whether the final video output is at the 0 volt level during the composite blank period. Because of various circuit offsets, the blanking level at the output of each video channel may not be exactly zero. If it is not, CPU 67 utilizes video process controller 61 and multi-DAC 81 to control adjustment device 89 (for the green video channel), adjustment device 91 (for the blue video channel), and adjustment device 93 (for the red video channel) to correct the offset.

The second step in the video test/calibration procedure is impedance matching of the selected video channel. A known video level is applied to the selected channel by fixing the reference voltage (the reference voltage is established by bias voltage adjustment circuit 85) to VDAC 55 and latching a known data value from CPU 67 into latch 75. The final output of the video channel selected is amplified and possibly level shifted by amplifier 58, converted into digital form by ADC 59, and latched into video process controller 61. CPU 67 then reads the value contained within video process controller 61 via bidirectional data bus 71. An "active video snap-shot" of the output on this channel is obtained by ADC 59 under the control of convert clock signal 63 and latched into video process controller 61. CPU 67 retrieves the "half" data from video process controller 61 and determines whether the final video output is matched to the display being driven. If it is not, CPU 67 utilizes video process controller 61 to adjust the programmable source impedance circuit ($Z_R$, $Z_B$, $Z_G$) via line 77. The read-back and adjustment process continues until the source impedance is set properly. As the impedance on all three channels should be the same, it is not necessary to repeat this calibration process for each channel.

The third step in the video test/calibration procedure is setting the maximum video level of the selected video channel. A maximum data level is applied to this video channel by CPU 67 via latch 75 (in some cases the maximum video level can be selected by forcing active a single input on specific VDACs). Again, an "active video snap-shot" of the final output of the video channel selected, and CPU 67 reads the "max video" data value contained within video process controller 61 to determine whether the maximum level is within the desired specifications. If it is not, CPU 67 utilizes video process controller 61 to generate a DAC control signal on line 79, which is applied to precision multi-DAC 81. Multi-DAC 81 in turn produces an analog output on line 83, which controls bias voltage adjustment device 85 so as to make the necessary adjustments to the reference voltage of video DAC 55. Here again, the read-back and adjustment process would continue until the maximum video level requirement has been met. The maximum video level adjustment does not need to be repeated for each of the three channels as long as the triple VDAC, as depicted in FIG. 4, has a common reference for each DAC contained within the part.

The final step in the video test/calibration procedure is to set the composite sync level of the green video channel after selection of this channel via VMUX 57. The composite sync portion of the video waveform is inserted into the green channel by current sync source 95. The timing of the sync portion is controlled by the "CSYNC" signal generated by video process controller 61 and applied to source 95 on line 97. The sync level is determined by the sync level control signal generated by an output from multi-DAC 81, on line 99. Following a "sync snap-shot" of the final output of the green video channel, CPU 67 reads the "sync" data value contained within video process controller 61 and determines whether the maximum level is within the desired specifications. If it is not, CPU 67 utilizes video process controller 61 to generate a DAC control signal on line 79, which is applied to precision multi-DAC 81. Multi-DAC 81 in turn produces an analog output on line 99, which controls the sync level control input into current sync source 95 so as to make the necessary sync level adjustment for the sync input into the green channel buffer $B_G$. Here again, the read-back and adjustment process would continue until the composite sync video level requirement has been met.

As mentioned above, the dynamic testing of the active video portion of a composite waveform is also possible in accordance with the invention. To do this, as memory array 51 is scanned and data is presented to VDAC 55 in real time, CPU 67 instructs the video process controller 61 to perform an "active video snap-shot". On receiving this command, video process controller 61 obtains the "active video snap-shot" of the final video output on the channel selected via VMUX 57. The "snapshot" data value is obtained by ADC 59 under the control of convert clock signal 63 and is latched into video process controller 61. CPU 67 retrieves this "current active video" data value from video process controller 61. CPU 67 also retrieves the corresponding data value (red, blue, or green) from latch 75. Based on these data values, a determination is made as to whether or not this video channel is failing and/or needs to be calibrated. This process allows for uninterrupted, dynamic testing of the active video portion of a composite waveform for any video channel selected.

The adjustment of output impedance, maximum video level, blanking level, and sync level described above may be conducted either statically, i.e., prior to a new application of the video output channel architecture, or "on the fly" to maintain proper calibration. Since no hardware modifications are required to switch between different display standards, the invention is advantageously able to generate a waveform indicative of the data stored in a memory array in any of the desired number of display standards without delay or inconvenience.

This invention has been described herein in considerable detail in order to comply with the Patent Statutes and to provide those skilled in the art with the information needed to apply the novel principles and to construct and use such specialized components as are required. While there have been shown and described various embodiments of the invention, the invention is not limited thereto, but rather is defined only by the scope of the following claims. It is to be understood that the invention can be carried out by specifically different equipment and devices, and that various modifications, both as to the equipment details and operating procedures, can be accomplished without departing from the scope of the invention itself.

The embodiments of the invention in which an exclusive property or right is claimed are defined as follows:

1. A configurable video output channel architecture, comprising:

random access memory which stores a display image in digital form;

a video look-up table which contains color palette information for converting said display image into digital color values;

digital to analog conversion means for converting said digital color values into analog color signals;

a video amplifier for amplifying the analog color signals;

selecting means for selecting one of the analog color signals and outputting a readback signal representative thereof, said selecting means comprises a multiplexer and an analog to digital converter; and adjusting means for adjusting a maximum picture level of said analog color signals to be within a desired range using said readback signal, said adjusting means comprises a controller for monitoring the readback signal and outputting an adjustment control signal, a digital to analog converter for converting the adjustment control signal to analog form, and a voltage adjustment device for adjusting the maximum picture level in accordance with the adjustment control signal.

2. A configurable video output channel architecture as claimed in claim 1, further comprising means for replacing one of said digital color values with test data, wherein a corresponding one of said analog color signals is selected by said selecting means.

3. A configurable video output channel architecture, comprising:

random access memory which stores a display image in digital form;

a video look-up table which contains color palette information for converting said display image data into digital color values;

digital to analog conversion means for converting said digital color values into analog color signals;

a video amplifier for amplifying the analog color signals;

selecting means for selecting one of the analog color signals and outputting a readback signal representative thereof, wherein said selecting means comprises a multiplexer and an analog to digital converter; and adjusting means for adjusting a blanking level of one of said analog color signals to be within a desired range using said readback signal, wherein said adjusting means comprises a controller for monitoring the readback signal and outputting an adjustment control signal, a digital to analog converter for converting the adjustment control signal to analog form, and a voltage adjustment device for adjusting the blanking level of said one analog color signal in accordance with the analog adjustment control signal.

4. A configurable video output channel architecture as claimed in claim 3, further comprising means for replacing one of said digital color values with test data, wherein a corresponding one of said analog color signals is selected by said selecting means.

5. A configurable video output channel architecture, comprising:

random access memory which stores a display image in digital form;

a video look-up table which contains color palette information for converting said display image data into digital color values;

digital to analog conversion means for converting said digital color values into analog color signals;

a video amplifier for amplifying the analog color signals;

selecting means for selecting one of the analog color signals and outputting a readback signal representative thereof, wherein said selecting means comprises a multiplexer and an analog to digital converter; and characteristic impedance adjusting means for adjusting a characteristic impedance of the selected analog color signal to be within a desired range using said readback signal, wherein said adjusting characteristic impedance means comprises a source impedance circuit and a controller for monitoring the readback signal and outputting an adjustment control signal in accordance therewith.

6. A configurable video output channel architecture as claimed in claim 5, further comprising means for replacing one of said digital color values with test data, wherein a corresponding one of said analog color signals is selected by said selecting means.

7. A configurable video output channel architecture, comprising:

random access memory which stores a display image in digital form;

a video look-up table which contains color palette information for converting said display image data into digital color values;

digital to analog conversion means for converting said digital color values into analog color signals;

a video amplifier for amplifying the analog color signals;

selecting means for selecting one of the analog color signals and outputting a readback signal representative thereof, wherein said selecting means comprises a multiplexer and an analog to digital converter; and adjusting means for adjusting a composite sync level of one of said analog color signals to be within a desired range using said readback signal, wherein said adjusting means comprises a controller for monitoring the readback signal and outputting an adjustment control signal, a digital to analog converter for converting the adjustment control signal to analog form, and a current source for adjusting the sync level of said one analog color signal in accordance with the adjustment control signal.

* * * * *